United States Patent [19]

Bouissou et al.

[11] Patent Number: 5,283,439

[45] Date of Patent: Feb. 1, 1994

[54] VERY ROBUST SCINTILLATOR DEVICE AND PROCESS OF MANUFACTURING IT

[75] Inventors: Claude Bouissou; Claude Baron, both of Saint-Pierre-Les-Nemours, France

[73] Assignee: Quartz Et Silice, Courbevoie, France

[21] Appl. No.: 5,988

[22] Filed: Jan. 19, 1993

[30] Foreign Application Priority Data

Jan. 17, 1992 [FR] France .................................. 92 00439

[51] Int. Cl.⁵ .............................................. G01T 1/202
[52] U.S. Cl. .................................. 250/368; 250/361 R; 250/483.1
[58] Field of Search ................. 250/368, 361 R, 483.1

[56] References Cited

U.S. PATENT DOCUMENTS

| | | | |
|---|---|---|---|
| 3,857,036 | 12/1974 | Novak et al. | 250/367 |
| 4,158,773 | 6/1979 | Novak | 250/368 |
| 4,383,175 | 5/1983 | Toepke | 250/368 |
| 4,764,677 | 8/1988 | Spurney | 250/361 R |
| 4,900,937 | 2/1990 | Dayton et al. | 250/368 |
| 4,994,673 | 2/1991 | Perna et al. | 250/483.1 |

*Primary Examiner*—Carolyn E. Fields
*Attorney, Agent, or Firm*—Oblon, Spivak, McClelland, Maier & Neustadt

[57] ABSTRACT

The scintillator uses a luminescent crystal (5) under the action of an ionizing radiation. It is particularly intended for use at high temperatures and accelerations. The crystal (5) is surrounded by PTFE powder (11) which is sintered cold and then conditioned hot and under pressure.

15 Claims, 2 Drawing Sheets

VERY ROBUST SCINTILLATOR DEVICE AND PROCESS OF MANUFACTURING IT

BACKGROUND OF THE INVENTION

1. Field of the Invention

The invention concerns the domain of crystal scintillators, in particular those which use a crystal of alkaline halogenides such as NaI(1) and more especially those which exhibit a good resistance to shocks and extreme temperatures.

2. Discussion of the Related Art

In order to detect invisible radiation, light of very short wave length (γ rays) or electronic radiation, crystals are currently used which transform this radiation into photons of longer wave length which can be detected and measured (in general by counting) with traditional photo-multipliers.

These appliances, called scintillators, are used in particular for oil prospecting where, in association with drilling tools, they permit the gathering of information on the ground crossed.

These very severe conditions of use and in particular the high temperatures and very violent shocks to which the scintillators are subjected necessitate designs of these appliances which are adapted to permit them to suffer these temperatures and these shocks without deterioration, and in particular without their response characteristics being modified.

The usual scintillators consist of four principal components: a case, a window, a crystal and a reflector. The case is cylindrical and made of stainless steel with an opening at each end. One end is closed by a glass window, hooped or glued in the opening. The photo-multiplier which is intended to detect the photons emitted in the crystal is placed against this window. The crystal itself is made of a material which scintillates under the action of ionizing radiation, in general a halogenide of alkaline or alkaline earth metals, preferably an iodide such as, for example, sodium iodide doped with thallium NaI(Tl). Its shape is also cylindrical; its surfaces are polished. One of the plane ends is generally optically connected to the window, for example, by means of a silicon resin and on its other faces—the cylindrical side face and the second plane end—it is equipped with reflectors which collect the light emitted and rediffuse it towards the window and the photo-multiplier situated behind it. The end of the cylinder opposite the window is tightly closed.

In scintillators designed specially to stand up to high temperatures and shocks, such as for example in the one which is described in the U.K. patent application GB 1 547 341, there has been provided behind the crystal a deformable elastic element which maintains optical contact between the crystal and the window, even when a shock acting on the mass of the crystal tends to separate it from the window.

Concerning the cylindrical side face of the crystal, it is best here also to maintain a close contact between this surface and the reflector. The British patent application GB 2 084 169 provides for a very thin layer made of a plastic strip of polytetrafluoroethylene (PTFE), and this serves as a lubricant. Between this strip and the internal wall of the metal cylinder the space is filled with a fine powder of alumina or magnesium oxide. In addition, at the rear, the elastic system is reinforced by spring washers which press strongly against the crystal. The lateral protection system described in the U.K. patent application GB 1 547 341 for its part, provides for a connection between the inside of the metal cylinder and the crystal which is constituted by a silicon elastomer. This transparent sleeve, possibly filled with powder, contains numerous excrescences in contact with the crystal and, between these, a filling with a powder such as alumina.

In another proposed solution, that of U.S. Pat. No. 4,900,937, it is specified to allow a greater longitudinal mobility of the crystal so as to permit, in the event of a shock, a material separation between the latter and the material which normally serves as an optical connection with the window, optical contact being automatically restored thanks to the recall springs as soon as the acceleration disappears.

The above systems taken in isolation or possibly in combination generally give satisfaction in the desired temperature range (up to 150° C.) and for accelerations up to 150 times that of gravity ($\leq 150$ g). However, when the shocks are more violent, for example they cause an acceleration of 500 g, the scintillators cannot stand up to it any longer and breakaways are found either at the window-optical connection or the optical connection-crystal interfaces or on the other faces of the crystal in contact with the reflector. Such breakaways modify the optical characteristics of the scintillator, and the response of the photo-multiplier corresponding to a given signal is no longer the same.

SUMMARY OF THE INVENTION

It is an object of the invention to provide a scintillator which does not exhibit the above disadvantages for accelerations as high as values on the order of 700 g and for temperatures which attain 180° C. The invention also has as an object to provide a process for manufacturing such a scintillator.

According to the invention, these objects are achieved thanks to a scintillator using a detector of alkaline or alkaline-earth halogenide crystal for the detection of ionizing radiation and comprises a case, a transparent window at one of the ends of the case, an optical connection between the window and one of the plane surfaces of the crystal, also comprising on the other surfaces of the crystal a diffusing white reflective material, preferably polytetrafluoroethylene based, the crystal being pressed against the optical connection and the latter against the window thanks to springs situated at the end of the case opposite to the window and in which the reflective material is in the form of sintered powder.

In this scintillator the springs act on the reflective material through the intermediary of a device which distributes the forces in the sintered powder, and the force which they produce on the crystal is at least equal to three quarters of the maximum force applied to the crystal in its extreme conditions of use.

The process of manufacturing the scintillator of the invention implements a use of the reflective material which, after selecting a polytetrafluoroethylene powder of a granulometry essentially less than 1 mm and drying it, comprises the following steps:

a. insertion of a quantity of powder at the periphery of the crystal maintained under pressure against the optical connection, pressing of the powder already inserted, repetition of the preceding operations until the periphery of the crystal is filled, b. insertion of a quantity of powder spread over the bottom of the crystal, pressing of the powder already inserted, repetition of the preceding operations until a final thickness on the order of 1.5 mm is obtained, c. sintering at temperature above the maximum utilization temperature of the scintillator and pressures progressing by stages to a value permitting the exertion on the crystal in the direction of its axis of a force of more than m·γ where m is the mass of the crystal and γ the maximum acceleration of use of the scintillator.

Thanks to the solution proposed by the invention, the corresponding scintillators have a considerably widened range of employment in comparison with scintillators manufactured previously. Thus they can undergo without damage numerous heat cycles between very low temperatures (down to −55° C.) and very high temperatures (up to +150° C).

Similarly multiple shocks at large accelerations (up to more than 700 g) do not cause any deterioration. In particular, in spite of these very brutal test conditions, the indications provided by a given photo-multiplier associated with the scintillator when it is subjected to a given ionizing radiation of definite intensity are not very different before and after the temperature and shock stresses.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
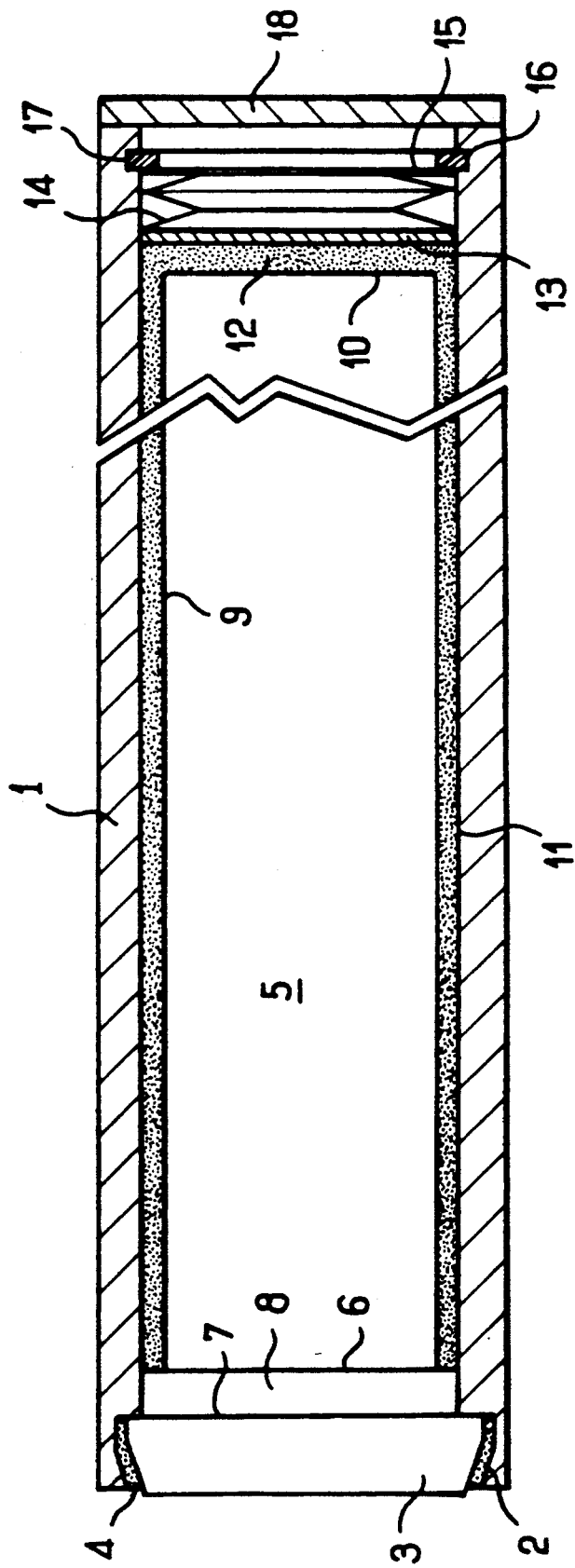
FIG. 1 shows a scintillator in accordance with the invention.

In FIG. 1, the scintillator of the invention comprises a cylindrical envelope 1 made of stainless steel. This is, for example, a cylinder 47 mm in internal diameter and 127 mm long. The wall of the cylinder has a thickness of about 2 mm. At one end of the cylinder an emplacement 2 has been provided in which a circular polished glass window 3 is inserted, for example an 801-51 glass from the Corning Company. The faces of the window are plane and parallel, having undergone an optical polish. The thickness is 8 mm. Between the glass 3 and the cylindrical envelope 1 is a transparent elastomer 4, for example a silicon mastic, to ensure a seal.

The active part of the scintillator is the detector 5. This is a cylindrical crystal (original dimensions: diameter 43 mm, length 97 mm), for example of sodium iodide doped with thallium NaI(Tl). The faces of the crystal are carefully polished. Its ends are plane surfaces.

The front end 6 is separated from the rear surface 7 to the window by what is called an "optical connection" 8. This is a transparent silicon resin. Permanently, via its front face 6, and by mechanical means which will be described below, the crystal 5 is pressed against the optical connection 8 which itself is pressed against the rear face 7 of the window.

On all the other faces, i.e., the cylindrical side face 9 and plane end 10, the crystal 5 is coated with PTFE powder sintered in situ (11, 12) by a method which will be described below. At the rear of the sintered PTFE material 12 there is a disc-shaped metal support plate 13. The plate 13 continuously exerts a pressure on the PTFE 11, 12 and therefore on all the elements which come after it: crystal 5, optical connection 8 and rear face 7 of the window 3.

The mechanical pressure means are spring washers 14 of CRIBO type (external diameter 40 mm, internal 14 mm, thickness 1.5 mm) three, for example. They press, on one side, against the plate 13 to distribute their force and, on the other, on a rigid washer 15, itself supported on a circlip 16 placed in a circular groove 17 provided in the wall of the cylinder 1. The case is finally closed by a plate 18 made of the same material as itself. This plate is welded in a manner giving a perfect seal after the internal space has been filled with a dry inert gas, such as nitrogen for example. At the bottom of the plate 18, on the outside, is provided a mechanical means of fixing the whole, which is not shown in the figure.

The scintillator which has been described is only an example of manufacture. The invention also covers scintillators with different proportions and with other crystals but keeping equivalent means for fulfilling the same functions as in the description above.

The method used for manufacturing scintillators of the type which has just been described comprises two principal stages: the coating of the crystal and its conditioning.

The coating of the crystal is effected in a controlled atmosphere installation, either in the presence of dry nitrogen or of another inert gas or in the presence of dry air. For example a glove box is used. The first stages of manufacture are those in the already known scintillators: insertion and gluing of the window, pouring of the resin constituting the optical connection, polymerization of this resin and finally putting in place the crystal on the optical connection after centering.

The coating proper of the crystal with a powder of a pulverulent sinterable material such as PTFE necessitates the use of two specialized tools which permit pressing of the powder: one is a cylindrical tube machined from solid PTFE and the other a solid cylinder of stainless steel. The external diameter of these two tools is the same; they fit the inside of the stainless steel case 1 exactly. These tools, loaded in the direction of their axis, can thus exert a considerable pressure on the powder to effect its sintering. The nature of the material constituting this powder is such as to give the sintered product a modulus of elasticity of the order of 400 megapascals, be white in color and remain diffusing. Polytetrafluoroethylene (PTFE) combines these characteristics.

In the case of PTFE, the powder preferably has a granulometry of less than 1 mm. It is for example comprised of grains having a diameter between 0.25 and 1 mm with few fines. It must be carefully dried, for example for more than 2 hours, at a temperature of 230° C. After drying it is stored in a glove box.

Figure 2:
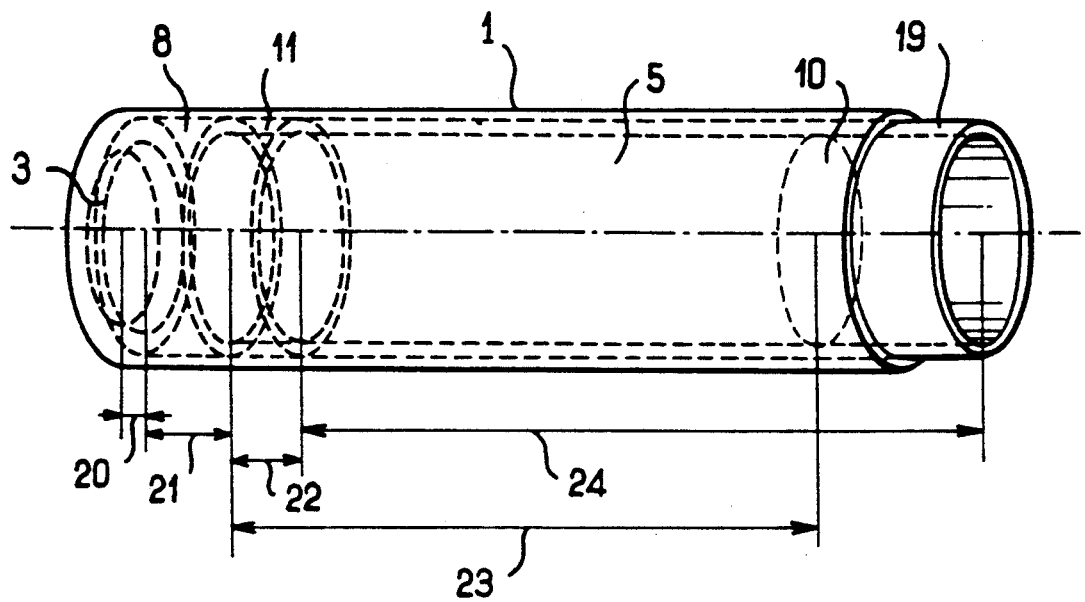
FIG. 2 shows one of the phases of the making of a scintillator.

The first stage of the coating is effected by means of the device shown in FIG 2. The case 1 can be seen in the figure already fitted with its window 3 and its optical connection 8 on which the crystal 5 is placed. The whole is placed vertically and a pressure is exerted on the crystal in the direction of its axis by means of a device not shown to avoid its moving or loosening from the optical connection.

The peripheral space 11 of the crystal is first filled to a height of about 10 mm and pressure is applied up to a value higher than 3500 hectopascals and preferably of about 3900 hectopascals via the cylindrical tube 19. The operation is repeated several times until the pressed PTFE material reaches the upper face 10 of the crystal. A last pressing is then effected at about 7500 hectopascals.

In FIG. 2, the reference 20 represents the thickness of the window, 21 that of the optical connection, 22 the height of the already pressed PTFE. 24 represents the length of the cylindrical pressing tube 19 and 23 that of the crystal.

The second stage of the coating concerns the crystal's rear reflector. The principle is the same as for the periphery, and only the tool is a cylindrical punch. The pressures are different: the pressure exerted after each addition of powder is of the order of 7500 hectopascals and the operation of filling stops when the thickness pressed is sufficient (for example 4 mm in the case of the scintillator of FIG. 1) but at least 1.5 mm. A last pressing is carried out at a higher pressure: 8300 hectopascals.

Figure 3:
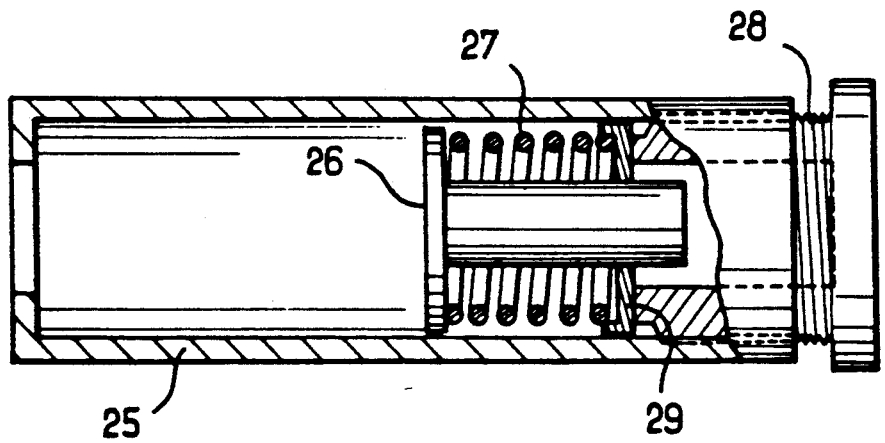
FIG. 3 shows an appliance for putting into operation the process of the invention.

The second stage of the manufacture of the scintillator according to the invention can then be carried out. This is the conditioning of the crystal, for which the device of FIG. 3 is used. This device essentially consists of a steel cylinder 25 intended to receive the scintillator and a piston 26 intended to press the crystal unit 5 and the peripheral reflector 11, 12 during periods at high temperatures. The pressure is exerted via a calibrated spring 27 on which the screw 28 acts via the plate 29. A preliminary standardization has made it possible to determine the force corresponding to a given number of turns of the screw and therefore the pressure on the crystal-reflector assembly which results from it.

The conditioning consists in subjecting the scintillator simultaneously to internal pressures and high temperatures. That is done in several steps (of at least 12 hours each), at progressively higher and higher pressures, the load phases at high temperature being separated by pauses under load but at ambient temperature.

The stages are, for example, 4 in number, successively:

11100 hectopascals at 185° C. for 24 hours,
14100 hectopascals at 185° C. for 24 hours,
16900 hectopascals at 185° C. for 24 hours,
19700 hectopascals at 185° C. for 24 hours.

At the end of the operation, once the assembly has come back to ambient temperature, we proceed to the definitive load and the closing of the case after filling it with the nitrogen atmosphere. The definitive permanent load, adjusted as a function of the nature and number of the spring washers 14 and of the play allowed, is for example 15000 hectopascals.

The scintillator of the invention was checked by use of a signal given by a PM 2102 E photo-multiplier and by a PM 9727 B photo-multiplier in the presence of a source of Cs 137, before and after 3 heat cycles of 8 hours from −55° C. to 150° C.

The scintillator output, expressed in percentages, were as follows:

|  | before | after |
| --- | --- | --- |
| PM 2102 E lateral | 9.9% | 9.4% |
| PM 9727 B lateral | 14.8% | 14.7% |

These results, which both correspond to the users' specifications, show a very good stability after the heat cycles. In addition, no modification of the appearance of the crystal was found when it was observed through the window. Similarly, shock tests up to 700 g showed an insignificant change in the resolution before and after the test and no change of appearance. In comparison, scintillators manufactured with traditional methods showed after the above tests at least breakaways between the crystal and its window and even, during shock tests, breakages of the crystals with the consequence, obviously, of an unacceptable deterioration of the signal provided by the photo-multiplier when it is subjected to a given ionizing radiation.

The method of manufacture of the scintillator according to the invention which has just been described is only an example, and one would not be going outside the framework of the invention if one changed the dimensions or the values of the above parameters. An order of magnitude should, however, be respected: it is important, if one wishes to resist a given acceleration $\gamma$, to exert during the conditioning of the crystal a force of the same order a that to which it will be subjected during the acceleration in question. Thus, with the crystal of NaI(Tl) shown in FIG. 1, which is intended to stand up to accelerations of the order of 700 g (g: acceleration of gravity: 9.8 m/sec$^2$) and which has a mass of 510 grams, the maximum pressure which is exerted on it (19700 hectopascals, or 20.1 kgf/cm$^2$) corresponds—given the surface of the piston 26 which is 17.7 cm$^2$—to a force:

$$f = P \cdot S = 20.1 \times 17.7 = 355.8 \text{ kgf}$$

Or:

$$9.8 \times 355.8 = 3704.4 \text{ newtons},$$

the acceleration which corresponds to it in the formula $$f = ma \text{ is:}$$

$$\gamma = \frac{f}{m} = \frac{3704.4}{0.510} = 7264 \text{ m/sec}^2$$

which is over 700 g.

The technique of the invention, limited in the example to accelerations of 700 g because of the limits due to the deformation of the case, makes it possible to achieve a resistance to even more violent shocks, such as for example 1000 g, on condition of respecting the previously stated rule. Thus, supposing that the mechanical resistance of the previous case is improved by increasing the thickness of its walls, a resistance to 1000 g can be obtained on condition of increasing the pressure, during the last phase of the conditioning of the crystal, up to 27000 hectopascals (instead of 19700). Similarly, the permanent pressure, obtained through the spring washers which, in a general manner, makes it possible to exert on the crystal a force at least equal to three quarters of the maximum force felt by the crystal in its extreme conditions of employment, it also reinforced in this case. Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Scintillator device for detection of ionizing radiation, comprising:
   a case having two ends;
   a transparent window at one of the ends of the case;
   a radiation detector fitted in the case and comprising an alkaline or alkaline-earth halogenide crystal;
   an optical connection between a plane face of said detector and said window;
   a diffusing white reflective material comprising a sintered powder and covering the other walls of said crystal; and
   a spring at the other of the ends of said case and pressing said crystal against said optical connection.

2. The scintillator device of claim 1 wherein said reflective material is polytetrafluoroethylene.

3. The scintillator device of claim 1 including a force distributor positioned between said crystal and said spring for distributing the force of the spring on the reflective material.

4. The scintillator device of claim 1 wherein the spring has a force at least equal to about three quarters of a maximum force anticipated to be applied to the crystal during operation.

5. A process for manufacturing a scintillator device for detection of ionizing radiation and having a case containing an alkaline or alkaline-earth halogenide crystal pressed on an optical connection to a transparent window of the case and covered with a sintered polytetrafluoroethylene diffusing white reflective material, comprising the sequential steps of:
   a) pressing the crystal against the optical connection;
   b) inserting a quantity of polytetrafluoroethylene powder to be sintered into a space between an internal wall of the case and a peripheral wall of the crystal;
   c) pressing the inserted powder;
   d) repeating steps b) and c) until the space is filled;
   e) inserting a quantity of the powder into the case and over an end of the crystal opposite the optical connection;
   f) pressing the inserted powder;
   g) repeating steps e) and f) until the powder over the end of the crystal has a thickness of about 1.5 mm; and
   h) sintering the powder at a temperature in excess of a maximum utilization temperature of the scintillator device and at a progressively increasing pressure, said sintering pressure having a maximum value which corresponds to an axial force of greater than m·γ being applied to the crystal, where:
   m = the mass of the crystal, and
   γ = the maximum acceleration which the crystal is anticipated to undergo.

6. The process of claim 5 wherein each of said steps b) comprises inserting sufficient powder to fill an axial height of about 10 mm in the space.

7. The process of claim 5 wherein each of said steps c) comprises pressing with a pressure in excess of 3500 hectopascals, wherein a final one of said steps c) comprises pressing with a pressure of about 7500 hectopascals.

8. The process of claim 5 wherein each of said steps e) comprises adding powder to a height of about 1 mm.

9. The process of claim 5 wherein each of said steps f) comprises pressing with a pressure in excess of 7000 hectopascals, wherein a final one of said steps f) comprises pressing with a pressure of about 8300 hectopascals.

10. The process of claim 5 wherein said step h) comprises sintering at a temperature of at least 150° C.

11. The process of claim 5 wherein said step h) comprises sintering at a temperature of at least 180° C.

12. The process of claim 10 wherein said step h) comprises maintaining the material being sintered for at least 12 hours at each of the progressively increasing pressures.

13. The process of claim 11 wherein said step h) comprises maintaining the material being sintered for at least 24 hours at each of the progressively increasing pressures.

14. The process of claim 12 wherein a final one of said pressures is about double a first one of said pressures.

15. The process of claim 12 wherein said step h) is carried out at four pressures which increase linearly.

* * * * *